United States Patent
Liu et al.

(10) Patent No.: US 11,180,988 B2
(45) Date of Patent: Nov. 23, 2021

(54) ACOUSTIC ISOLATION DEVICES FOR ACOUSTIC WELL LOGGING TOOLS

(71) Applicant: Baker Hughes Oilfield Operations LLC, Houston, TX (US)

(72) Inventors: Weidong Liu, The Woodlands, TX (US); Raphael Rogman, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 16/786,652

(22) Filed: Feb. 10, 2020

(65) Prior Publication Data

US 2020/0256185 A1    Aug. 13, 2020

Related U.S. Application Data

(60) Provisional application No. 62/803,482, filed on Feb. 9, 2019.

(51) Int. Cl.
    *E21B 47/16*    (2006.01)
(52) U.S. Cl.
    CPC ..................... *E21B 47/16* (2013.01)
(58) Field of Classification Search
    CPC .......................................................... E21B 47/16
    See application file for complete search history.

(56) References Cited

U.S. PATENT DOCUMENTS

| | | | |
|---|---|---|---|
| 5,728,978 A | 3/1998 | Roberts et al. | |
| 2003/0052185 A1* | 3/2003 | Arian | G01V 1/523 239/102.2 |
| 2003/0164236 A1 | 9/2003 | Thornton | |
| 2008/0149415 A1* | 6/2008 | Botting | G01V 1/523 181/102 |
| 2015/0146501 A1* | 5/2015 | Ratcliffe | G01V 1/44 367/25 |
| 2016/0003960 A1* | 1/2016 | Chang | G01V 1/523 367/25 |
| 2018/0245422 A1* | 8/2018 | Fripp | E21B 33/1285 |

OTHER PUBLICATIONS

International Search Report and Written Opinion dated Apr. 16, 2020 in corresponding PCT Application No. PCT/US20/17519.
International Search Report and Written Opinion dated Apr. 16, 2020, corresponding to PCT/US2020/017519.

* cited by examiner

*Primary Examiner* — Amine Benlagsir
(74) *Attorney, Agent, or Firm* — Hogan Lovells US LLP

(57) ABSTRACT

An acoustic isolation device includes a sleeve having a length, central axis along the length, a first end and a second end and an interior between the first end and second end, the cylindrical sleeve further comprising at least one resiliently deformable section between the first end and the second end along a least a portion of the length of the cylindrical sleeve allowing the cylindrical sleeve to be deflected, and a tab stop structure positioned along the length of the deformable section of the cylindrical sleeve and having at least one tab stop positioned in the sleeve, the cavity providing a gap around one or more sides of the at least one tab stop, wherein the at least one tab stop is movable within the cavity as the sleeve is deformed but restricts the sleeve from being deformed by more than a predetermined amount or estimated amount.

20 Claims, 14 Drawing Sheets

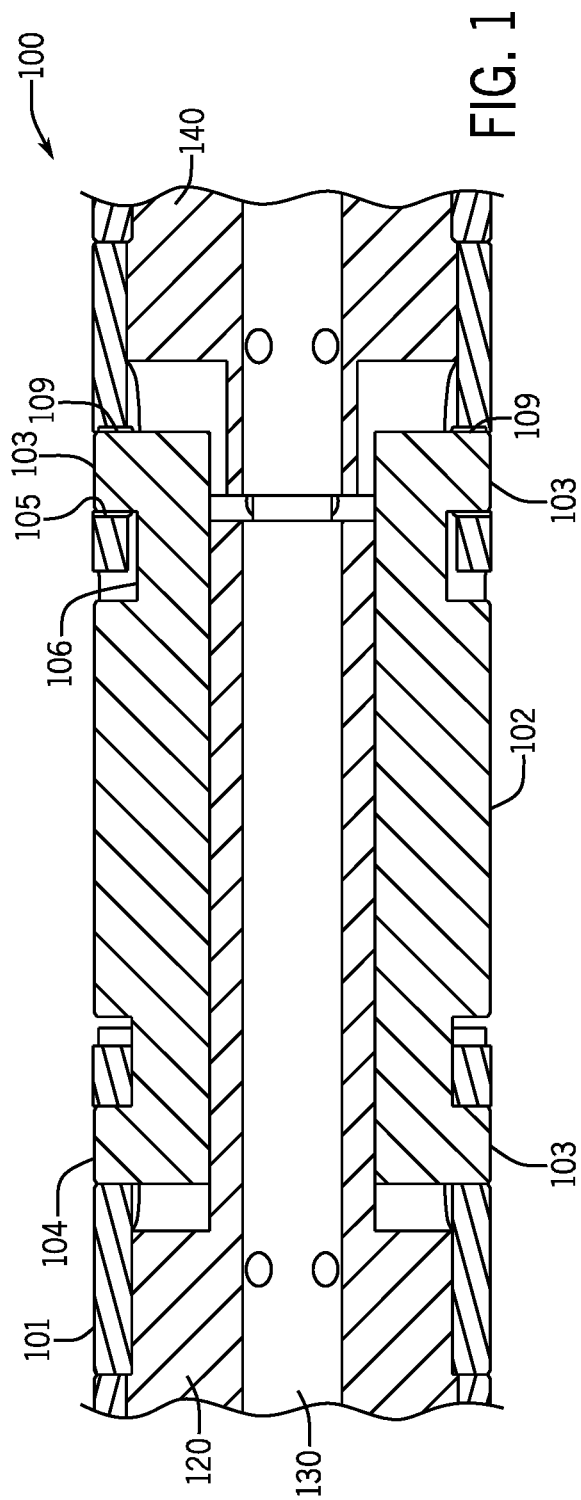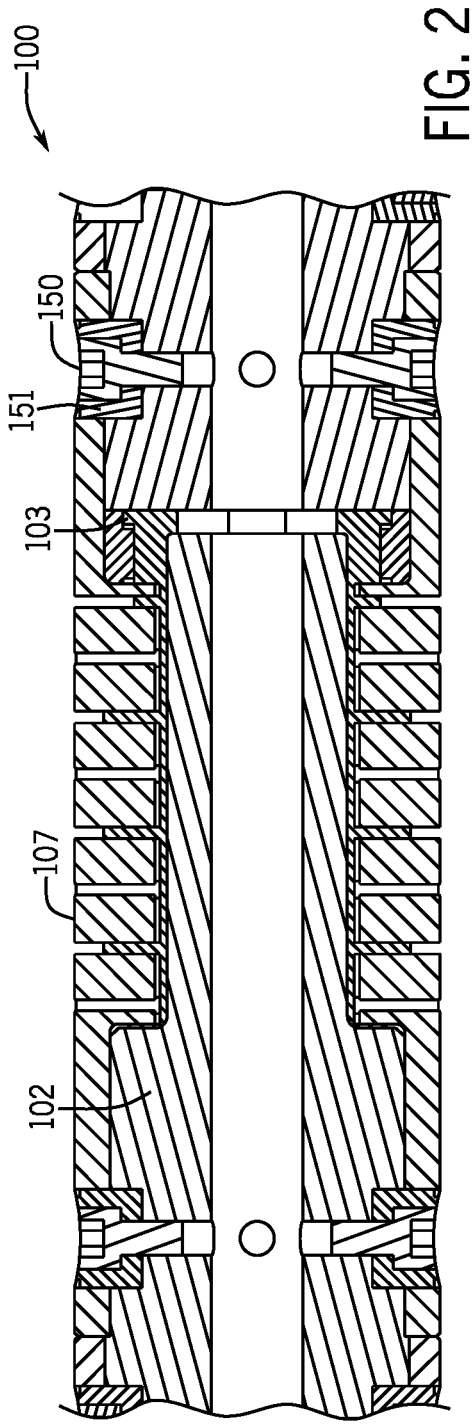

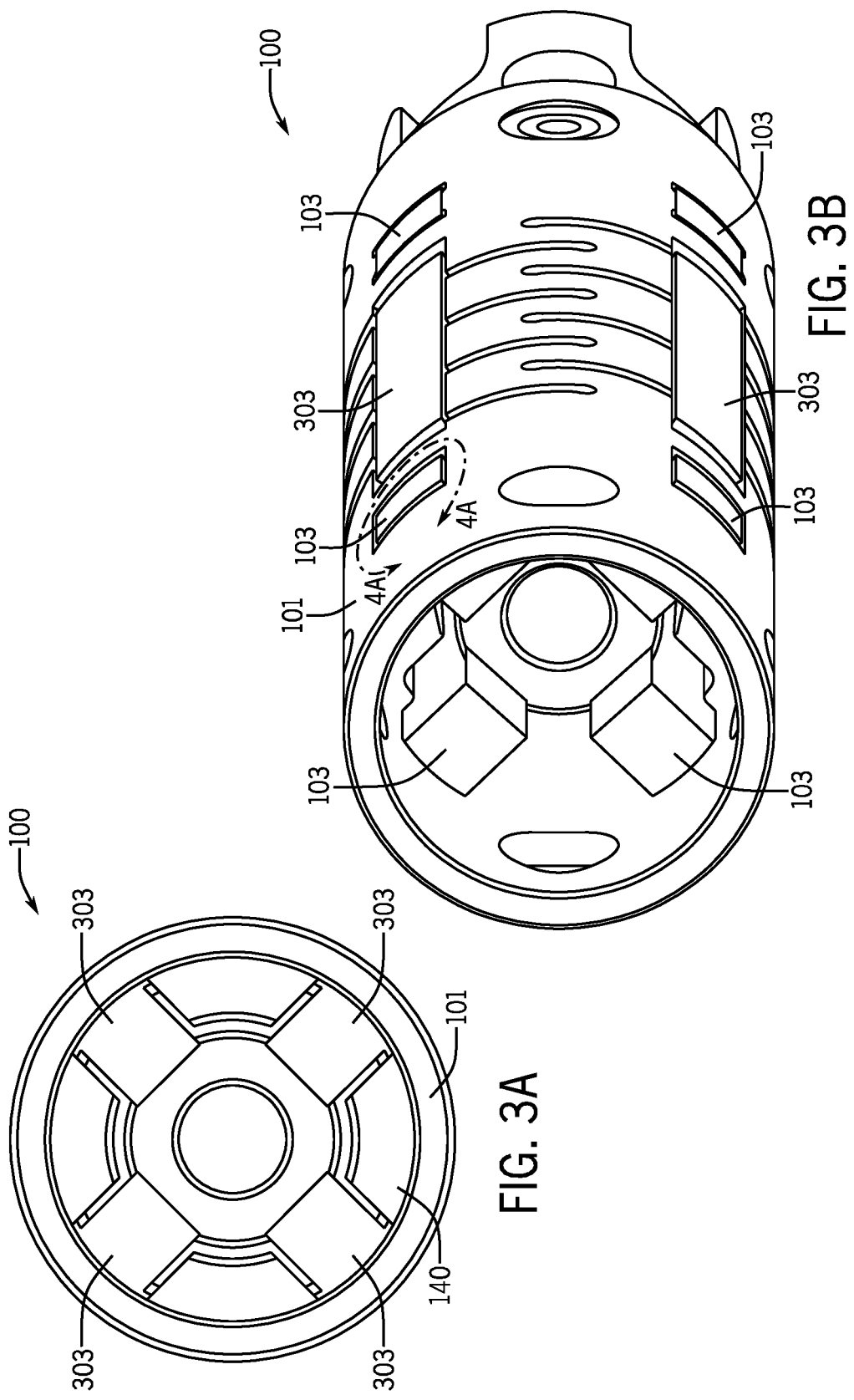

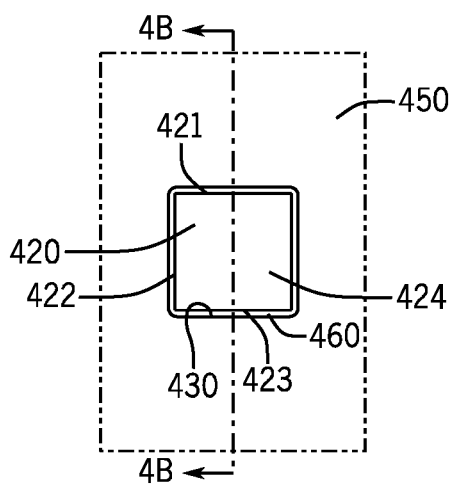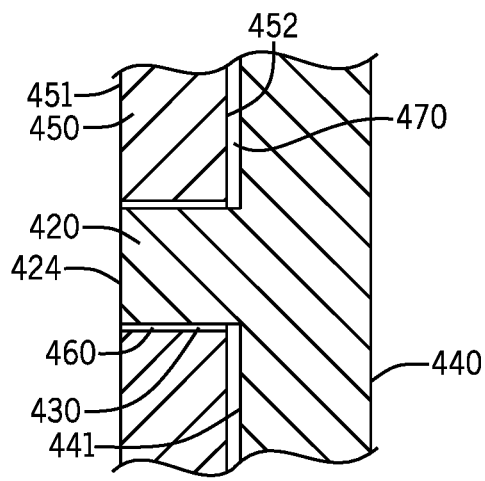
FIG. 4A  FIG. 4B
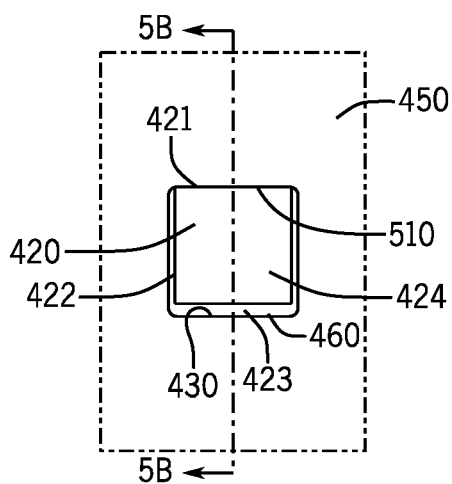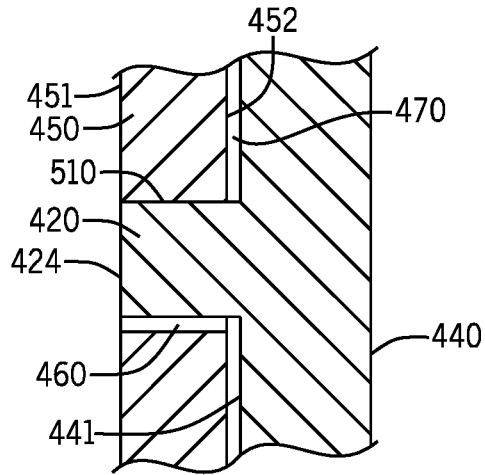
FIG. 5A  FIG. 5B
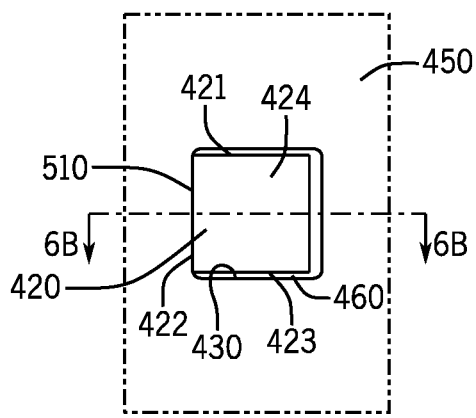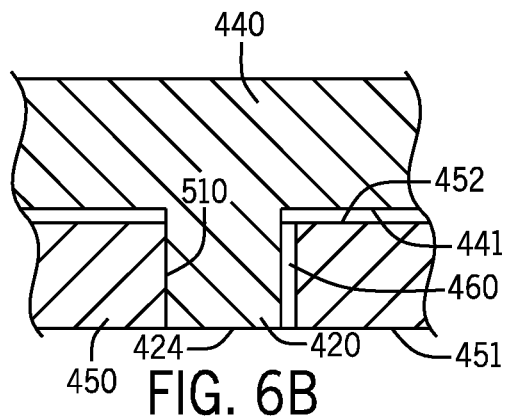
FIG. 6A  FIG. 6B

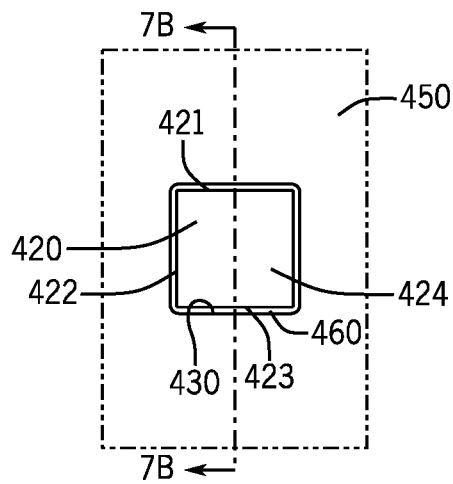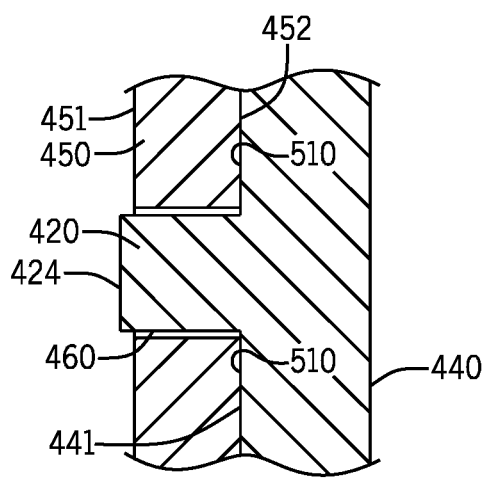
FIG. 7A    FIG. 7B
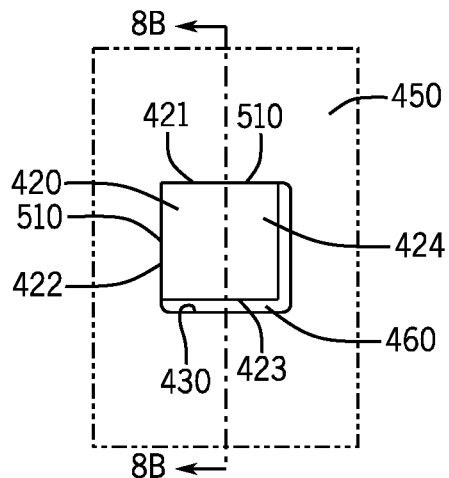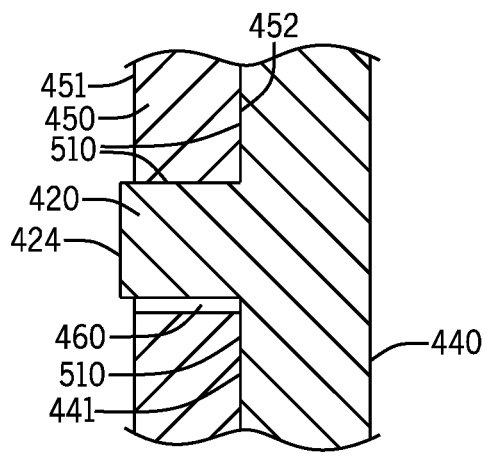
FIG. 8A    FIG. 8B
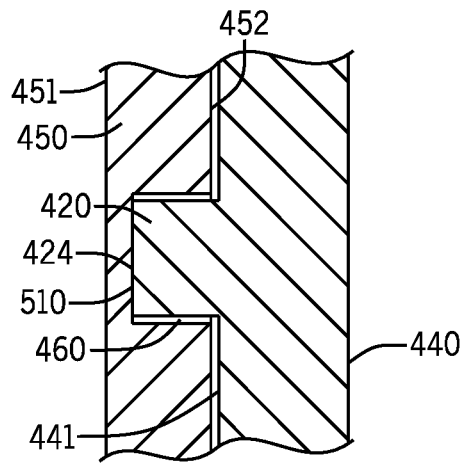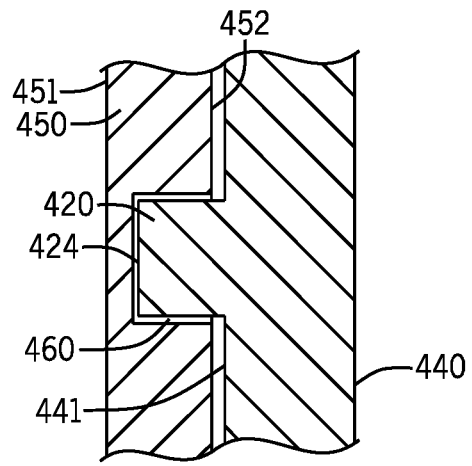
FIG. 9A    FIG. 9B

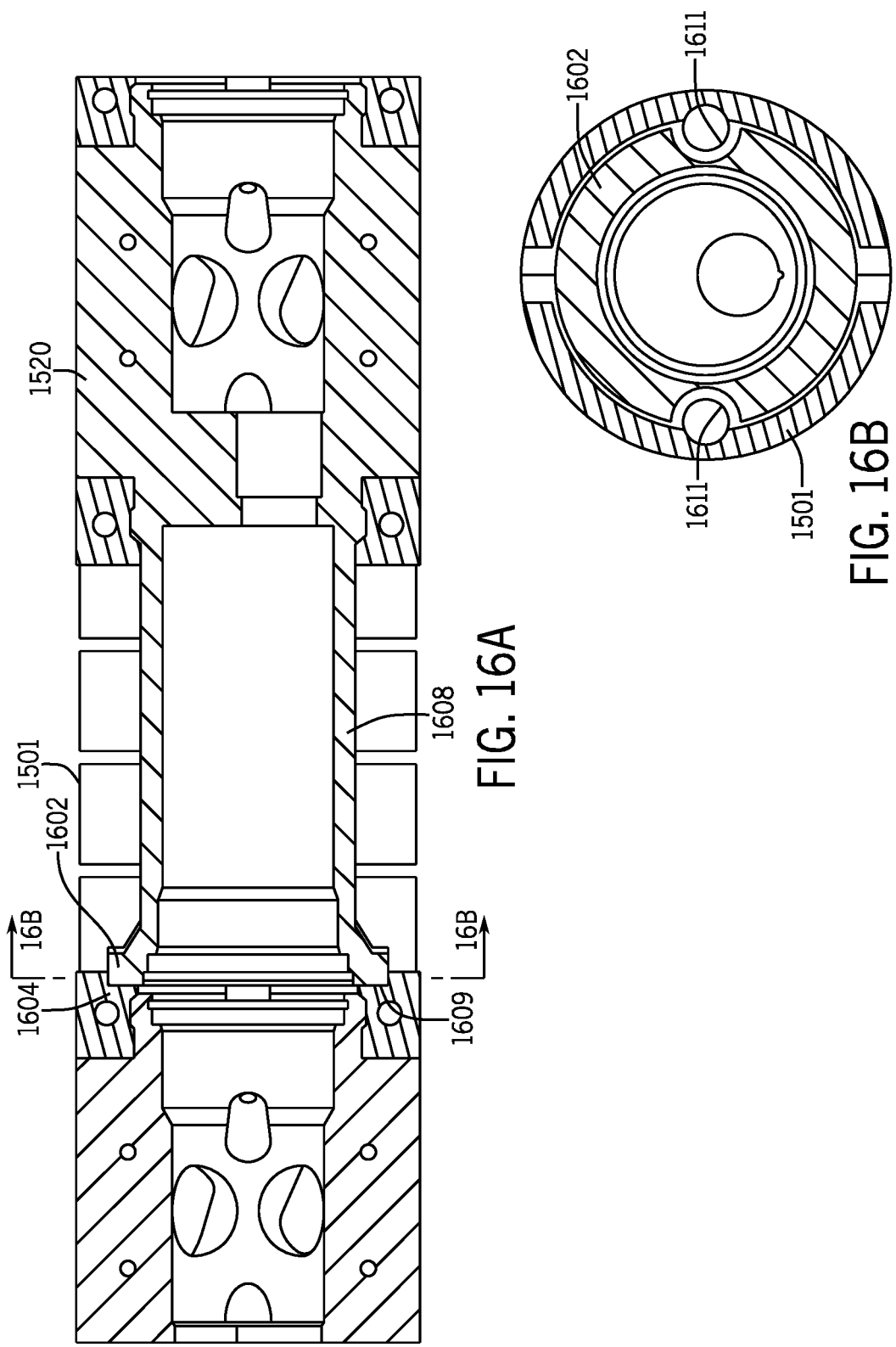

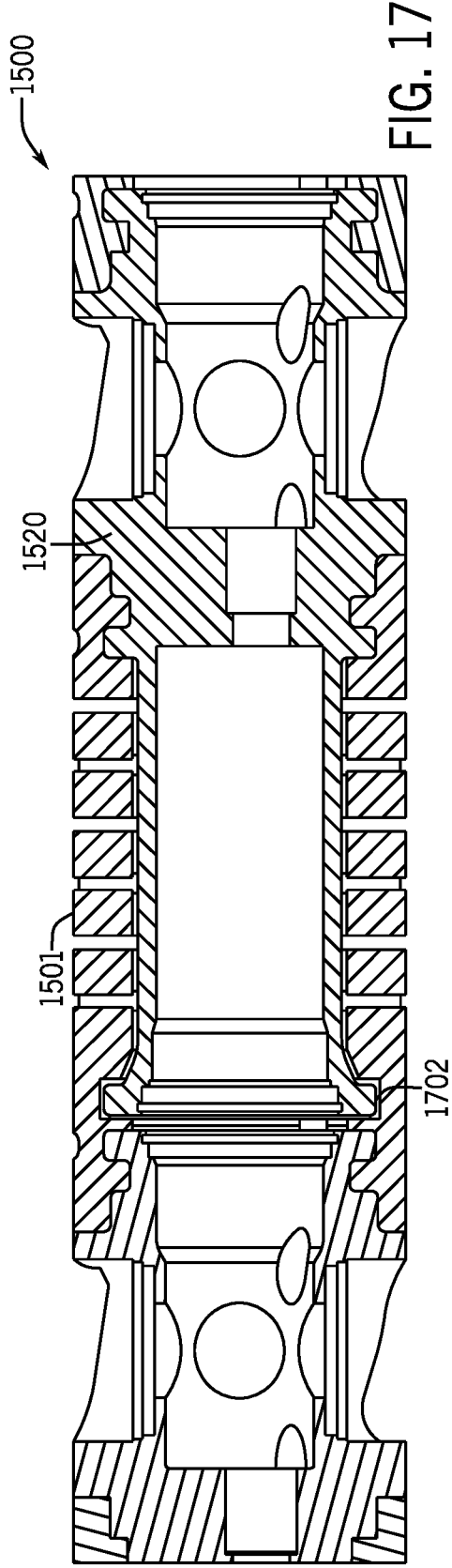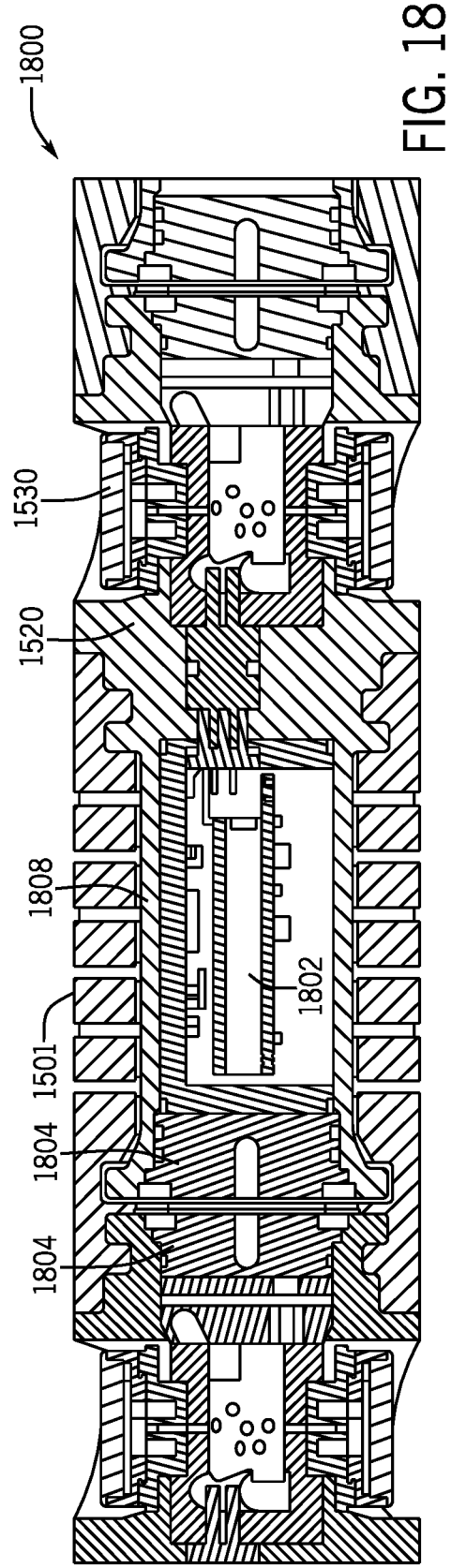

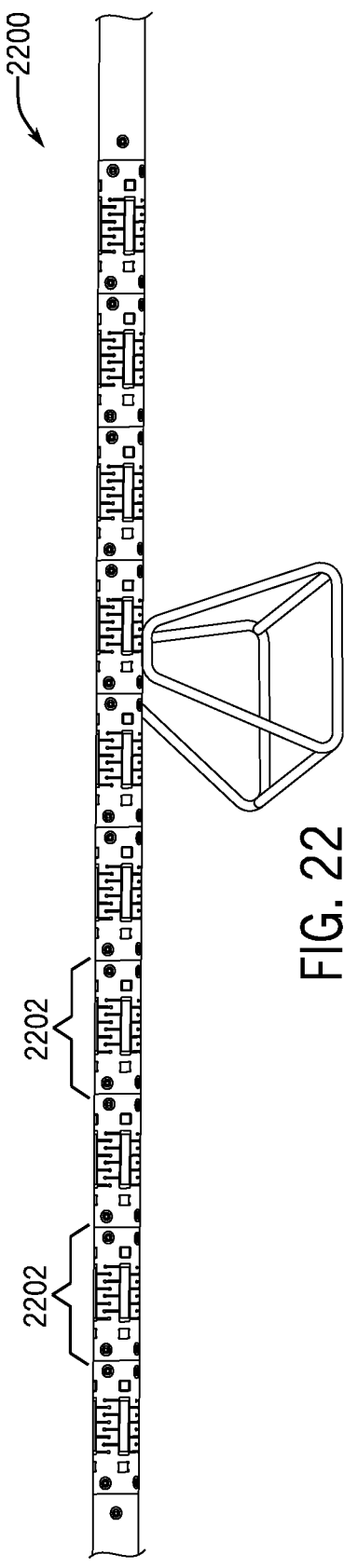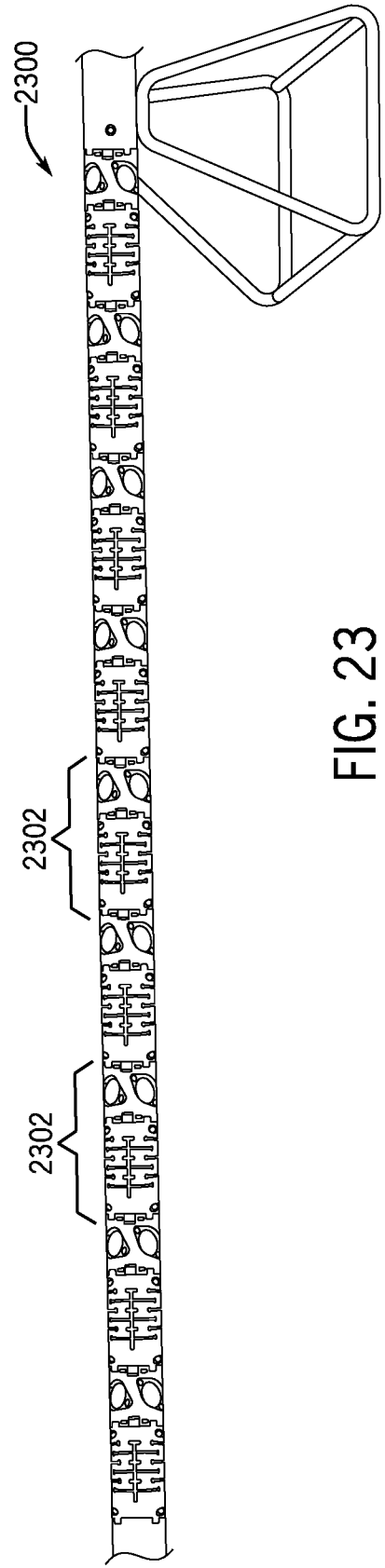

ACOUSTIC ISOLATION DEVICES FOR ACOUSTIC WELL LOGGING TOOLS

CROSS REFERENCE TO RELATED APPLICATIONS

This application claims priority to and the benefit of U.S. Provisional Patent Application Ser. No. 62/803,482 filed Feb. 9, 2019 titled "Acoustically Isolating Devices for Acoustic Well Logging Tools and Methods of Using the Same," the full disclosures of which is hereby incorporated herein by reference in its entirety for all purposes.

FIELD OF INVENTION

The invention generally relates to acoustic isolation devices for an acoustic well logging tools and methods of using the same and systems incorporating the same.

BACKGROUND

An acoustic logging tool configured as cylindrically shaped, tubular bodies which is suitably sized for passage through a fluid well bore, typically includes a transmitter section comprising one or more transmitters and a receiver section comprising one or more receivers located some distance away from the transmitters. An acoustic signal generated by a transmitter is typically transmitted against or through a target (e.g., underground rock, soil, etc.) to the receiver section and the signal captured by the receivers allow the characterization of the target. This characterization can include bulk modulus, density, rigidity, geometry, internal stress, presence and nature of fluids, speed of sound, or the presence and location of voids or cracks.

The acoustic signals will not only propagate to or through the target to the receivers but will take any other available acoustic path to the receiver. This acoustic path can be through the structure containing both the transmitter and receiver, through the fluid where both are located, or through a combination of the fluid and structure. These acoustic paths can be referred to as noise. The acoustic signal following the desired path through or to the target is typically received as weaker than the transmitted signal and in certain cases is very weak and requires significant amplification. The signal taking other acoustic paths to the receiver (noise), including the structure and surrounding fluids, can interfere with the signal going through the desired path measured by the receivers. Other signals (noise) can be the same order of magnitude or larger than the desired path signal or can arrive before the desired path signal. As a result, it is desirable to block or delay the signal traveling through the wrong path. This blocking or delay can take place through a number of methods. Some of these include constructive interference, filtering, mechanical decoupling, isolation, and attenuation, etc. This can be achieved either through electronic means or preferably through mechanical methods.

A dipole acoustic logging tool is an example of an acoustic tool that has to deal with undesired signals. It carries multiple transmitters and an array of receivers located at a set distance from the transmitter. Dipole (and also typically a monopole) transmitters are used to send investigating signals. The monopole signal is typically between 5 and 15 kHz and the dipole signal between 800 and 8000 Hz. The signal travels through the borehole fluid to the formation where it propagates. The signal gives rise to multiple waves in the formation. Some waves of interest are the compressional wave, shear wave, Stonely wave, and flexural wave. Some waves such as the Stonely wave follow the borehole and will attenuate relatively slowly as it travels along the wellbore form the transmitter. Other waves such as the compressional wave radiate spherically and lose strength more rapidly as distance from the transmitter increases. As the waves propagate in the rock and down the borehole, compressional waves are continually reemitted in the downhole fluid from the interface between the borehole and downhole fluid.

The signal will also be transmitted down the body of the tool. This body signal can be especially pronounced for a dipole transmitter. As it relies on creating an unbalanced pressure field it requires a differential pressure on opposite sides of the transmitter and an oscillating unbalanced force is transferred to the tool. This force will result in a vibration propagating up and down the tool. The body signal for a monopole tool is comparatively less. As pressures are balanced, no force is transmitted to the tool.

This can be illustrated by imagining a person floating in a small pool as an acoustic transmitter. Monopole waves can be thought of as circular ripples propagating around the person. Dipole waves are more similar to sloshing the water from one side to the other of the pool. Monopole waves (circular ripples) can be easily produced by the person bobbing up and down without holding on to something. Dipole waves (sloshing) cannot be produced without the person holding on to something. An oscillating force or vibration is transmitted to a structure in the case of sloshing, while bobbing doesn't require any contact. It is possible to make a dipole transmitter that does not require/or minimizes structural contact by relying on an inertial mass. Ideally the inertial mass should not be in contact with fluid to not emit a signal of its own. The larger the mass the less vibration is transmitted to the tool and the more efficient the transmitter. This requires a significantly sized transmitter to have a sufficient mass to produce a signal of adequate strength. This is particularly challenging for a tool the size of the Signum Instruments dipole tool, for example.

Assuming the tool is made of steel, the signal will be transmitted rapidly down the body of the tool (5920 m/s) while also continually reemitting an acoustic signal in the borehole fluid. The signal will travel slower through rock (1600 to 6000 m/s). The receiver will therefore first receive the signal transmitted down the tool which will also be much stronger than the signal transmitted through the rock which will be a few orders of magnitude weaker than the tool signal. It is therefore imperative to the design of a good acoustic tool to attenuate the body signal as much as possible. The weaker the body signal, the more sensitive the tool. The housing between the transmitter and receiver needs to reduce the strength of the signal transmitted from one to the other or to isolate them from each other and is therefore called an isolator. As mentioned above, the signal that is of greater concern is the dipole signal which will result in a transverse wave propagating up and down the tool. A steel housing has a very high transverse stiffness and therefore will propagate the signal easily. Ideal housings would have a very low transverse stiffness through either material that have intrinsically a very low transverse stiffness (rubber) or geometrically have a low stiffness (cables). An overly flexible housing is unacceptable for a downhole tool. Rigidity is required to allow easy transportation and rig up. If the tool is used for horizontal logging, the tool needs to be sufficiently rigid to generally centralize receivers. It also has to be able to handle compressional loads without buckling and generally be more robust.

SUMMARY

An acoustic isolation device for a logging tool includes a cylindrical sleeve and a tab stop structure. The cylindrical sleeve has a length, central axis along the length, a first end and a second end and an interior between the first end and second end and an outer surface and an inner surface defining the interior and an annulus region between the inner surface and the outer surface. The cylindrical sleeve further includes at least one resiliently deformable section between the first end and the second end along a least a portion of the length of the cylindrical sleeve allowing the cylindrical sleeve to be deflected. The isolation device further includes a tab stop structure positioned along the length of or adjacent to the deformable section of the cylindrical sleeve and having at least one tab stop extending from the tab stop structure and positioned in a cavity within or adjacent the annulus region of the cylindrical sleeve. The cavity provides a gap around one or more sides of the at least one tab stop. At least one tab stop is movable within the cavity as the sleeve is deformed but restricts the sleeve from being deformed by more than a predetermined amount or estimated amount.

An acoustic isolation device for an acoustic well logging tool includes a sleeve having a length, central axis along the length, a first end and a second end and an interior between the first end and second end, and a resiliently deformable section between the first end and the second end along a least a portion of the length of the sleeve configured to allow the sleeve to be deformed. The acoustic isolation device further includes a rigid structure connected to or adjacent the cylindrical sleeve and configured to allow the sleeve to be deformed but restricts the sleeve from being deformed by more than a predetermined amount.

An acoustic logging tool includes a transmitter, a receiver, and an acoustic isolation assembly. The acoustic isolation assembly includes a sleeve having a length, central axis along the length, a first end and a second end and an interior between the first end and second end, and a resiliently deformable section between the first end and the second end along a least a portion of the length of the sleeve configured to allow the sleeve to be deformed. The acoustic isolation assembly further includes a rigid structure connected to or adjacent the cylindrical sleeve and configured to allow the sleeve to be deformed but restricts the sleeve from being deformed by more than a predetermined amount.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following figures:

FIG. 1 is a cross-sectional schematic side view of selected components of an isolator device according to one embodiment of the invention.

FIG. 2 is a side cross-sectional schematic view the isolator of FIG. 1 (rotated 45 degrees along the central axis).

FIG. 3A is an end view of an isolator according to the same embodiment of the invention showing line A-A indicating the cross-sectional view in FIG. 1 and line B-B indicating the cross-sectional view in FIG. 2.

FIG. 3B is an end view of the isolator of FIG. 3A.

FIG. 4A is a top view of a schematic representation of a tab stop within a cavity of a sleeve or other component according to another embodiment of the invention.

FIG. 4B is a cross-sectional side view of FIG. 4A.

FIG. 5A is a top view of the embodiment of FIG. 4A showing stop activation limiting deformation (e.g., compression).

FIG. 5B is a cross-sectional side view of FIG. 5A.

FIG. 6A is a top view of the embodiment of FIG. 4A showing stop activation limiting deformation (e.g., perpendicular motion or torsion).

FIG. 6B is a cross-sectional side view of FIG. 6A.

FIG. 7A is a top view of the embodiment of FIG. 4A showing stop activation limiting deformation (e.g., perpendicular motion).

FIG. 7B is a cross-sectional side view of FIG. 5A.

FIG. 8A is a top view of the embodiment of FIG. 4A showing stop activation limiting a combination of loads (e.g., torsion or perpendicular motion and compression).

FIG. 8B is a cross-sectional side view of FIG. 8A.

FIG. 9A is a cross-sectional view of another embodiment showing a tab top not protruding through sleeve and showing stop activation limiting deformation (e.g., perpendicular motion of the sleeve).

FIG. 9B is a cross-sectional view of FIG. 9A showing no stop activation limiting deformation (e.g., gap shown adjacent tab stop stop).

FIG. 16A is a side cross-sectional schematic view of the isolator of FIG. 15.

FIG. 16B is a front cross-sectional schematic view of the isolator of FIG. 15 along the red dashed line.

FIG. 17 is a side cross-sectional schematic view of the isolator of FIG. 15.

FIG. 18 is a side cross-sectional schematic view of the isolator of FIG. 15 according to another embodiment.

FIG. 22 illustrates a connected series of isolators according to another embodiment of the invention.

FIG. 23 illustrates a connected series of receiver isolators according to another embodiment of the invention.

DETAILED DESCRIPTION OF THE INVENTION

Figure 10:
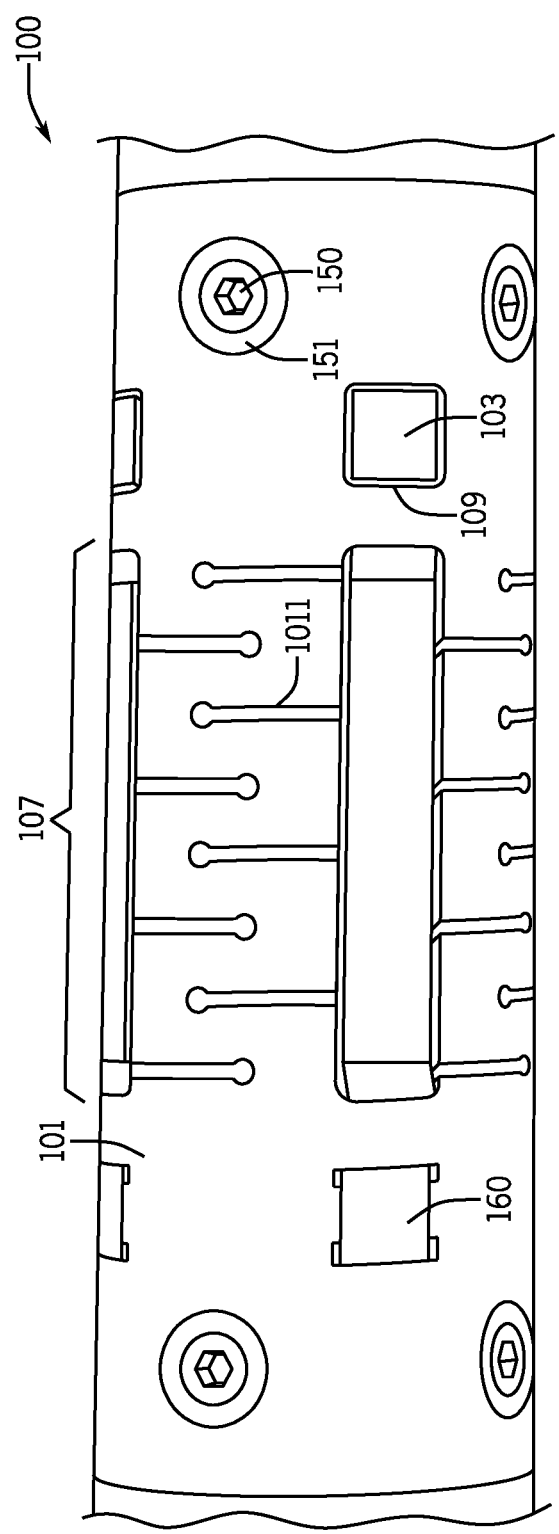
FIG. 10 is a side view of the embodiment of FIGS. 1, 2, and 3.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

In various embodiments, like components may be referred to with the same reference numerals throughout the specification. However, in certain embodiments, different reference numerals may be used for clarity. Additionally, components of a similar nature may be referred to with a reference numeral and a letter, such as A and B, for clarity, and should not be construed as limiting. For example, while similar components may be referred to with reference numerals and an associated A and B, there components may have different sizes, shapes, or different operational mechanisms.

The terms "deformation" or "deformed" means bending or bent/bowed, flexed, torsion, transverse loads (e.g., transversely deformed), sheared/shearing, tension, torsionally deformed, compression and combination thereof. The shearing mode is believed the most important one for dipole waves. The term "stop contact rest point" refers to when a first surface contacts an opposing second surface to resist or prevent further deformation. The term "resiliently deformable" means spring or spring-like, that is, capable of being repeatedly "deformed" and return to original shape or near original shape.

The present disclosure generally relates to improved acoustic isolation devices for an acoustic well logging tool and/or acoustic well logging tools adapted with improved acoustic isolation devices and methods of making the devices and/or tools and methods of using the same. One aspect of the invention involves a method of constructing a member or device for use in or with acoustic well logging tools that will both attenuate and slow down acoustic signals which can be used in either an acoustic isolator or an acoustic receiver. Typically, the isolator and receiver are part of an acoustic logging tool, for example, as shown in series in FIGS. 23-25, where the acoustic signal (e.g., to perform measurements and diagnostics) is either a dipole or monopole wave. However, the present invention would also be effective for other types of acoustic waves: Lamb, Stonely, Quadropole, etc. One primary consideration to the design of an effective acoustic isolating member according to preferred embodiments is not only its ability to act on acoustic signals, but also to have favorable structural properties: acceptable axial and transverse stiffness and strength, preferably configured to be acceptable for use, preferably repeated use, in acoustic well logging tool applications, both vertical, horizontal and combinations thereof.

One aspect of the present invention relates to the use of materials or components having different mechanical properties (primarily stiffness) to control or limit or restrict the amount of deformation while providing acoustic isolation properties. For example, an isolator having at least two components having different stiffness properties, namely a first component adapted to provided acoustic isolation properties, while a second having increased mechanical properties (e.g., stiffness) adapted to control or limit or restrict the amount of deformation of the first component during use (e.g., by employing one or more mechanical stops created when a surface of the first component contacts a surface of the second component thereby restricting additional deformation). Preferably, the second component preferably provides both increased axial strength and increased transverse strength by using different materials, different methods of making, and/or different size and/or shape and/or configuration. Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

In some embodiments, the first component and second component are configured to restrict deformation by more than a predetermined amount or more than an estimated amount or otherwise be configured to resist general ranges of deformations and/or otherwise provide additional stiffness to the isolator device. One embodiment of the invention relates to an acoustic isolation device for an acoustic well logging tool, the acoustic isolation device comprising: a cylindrical sleeve having a length, central axis along the length, a first end and a second end and an interior between the first end and second end and an outer surface and an inner surface defining the interior and an annulus region between the inner surface and the outer surface, the cylindrical sleeve further comprising at least one resiliently deformable section between the first end and the second end along a least a portion of the length of the cylindrical sleeve configured to allow the cylindrical sleeve to be deformed and/or deflected, and a tab stop structure positioned along the length of or adjacent to the deformable section of the cylindrical sleeve and having at least one tab stop extending from the tab stop structure and configured to be positioned in a cavity within and/or adjacent the annulus region of the cylindrical sleeve, the cavity configured to provide a gap around one or more sides of the at least one tab stop, wherein the at least one tab stop can move within the cavity as the cylindrical sleeve is deformed but restricts the cylindrical sleeve from being deformed by more than a predetermined amount.

Another embodiment of the invention relates to an acoustic isolation device for an acoustic well logging tool, the acoustic isolation device comprising: a sleeve having a length, central axis along the length, a first end and a second end and an interior between the first end and second end and an outer surface and an inner surface defining the interior and an annulus region between the inner surface and the outer surface, the sleeve further comprising a resiliently deformable section between the first end and the second end along a least a portion of the length of the sleeve configured to allow the sleeve to be deformed, and at least one tab stop positioned in a cavity within the annulus region of the cylindrical sleeve, the cavity configured to provide a gap around one or more sides of the at least one tab stop, wherein the at least one tab stop moves within the cavity as the sleeve is deformed but restricts the sleeve from being deformed by more than a predetermined amount.

Yet another embodiment of the invention relates to an acoustic isolation device for an acoustic well logging tool, the acoustic isolation device comprising: a sleeve having a length, a first end and a second end, the sleeve comprising a resiliently deformable section between the first end and the second end along a least a portion of the length of the sleeve configured to allow the sleeve to be deformed, and at least one tab stop positioned in a cavity or opening in the sleeve, the cavity or opening configured to provide a gap around one or more sides of the at least one tab, wherein the at least one tab stop moves within the cavity or opening as the sleeve is deformed but restricts the sleeve from being deformed by more than a predetermined amount.

Yet another embodiment of the invention relates to an acoustic isolation device for an acoustic well logging tool, the acoustic isolation device comprising: a sleeve having a length, a first end and a second end, the spring further comprising a resiliently deformable section between the first end and the second end along a least a portion of the length of the spring configured to allow the spring to be deformed and at least one tab stop extending from the sleeve (preferably, at least one tab stop extending from the first end along the length of or adjacent to the deformable section of the cylindrical sleeve to the second end); and at least one structure comprising a cavity corresponding to the at least one tab stop, the cavity configured to provide a gap around one or more sides of the at least one tab, wherein the at least one tab stop moves within the cavity as the spring is deformed but restricts the sleeve from being deformed by more than a predetermined amount.

Yet another embodiment of the invention relates to an acoustic well logging tool, the acoustic isolation device comprising: a sleeve having a length, central axis along the length, a first end and a second end and an interior between the first end and second end and comprising a resiliently deformable section between the first end and the second end along a least a portion of the length of the sleeve configured to allow the sleeve to be deformed, and a rigid structure connected to or adjacent the cylindrical sleeve and configured to allow the sleeve to be deformed but restricts the sleeve from being deformed by more than a predetermined amount.

According to some embodiments, the "cylindrical sleeve" or "sleeve" can have a circular or polygonal cross-section (or square or rectangular or other cross-section). However, alternative shapes or configurations are possible. According to some embodiments, the sleeve is a single part (i.e., a tube-like structure). According to alternative preferred embodiments, the sleeve is comprised for two or more parts, for example, two C-shaped halves that are configured to be joined to form a sleeve having a circular or polygonal or square or rectangular or other cross-section (e.g., the two-part sleeves shown in FIGS. 20-22). According to some embodiments, the cylindrical sleeve has a polygonal cross-section (vs. circular). According to some embodiments, the isolator device is comprised of a "single piece" (e.g., both the sleeve and tab stop structure integral with tab stop) formed by cavity molding or printing or otherwise carved or formed (e.g., 3D screen printed). For example, a sleeve with both the spring-like structure (e.g., slots) and tab stop structure having at least one tab stop formed using 3D printing technology.

According to some embodiments, the "sleeve" is tubular in shape. According to other embodiments, the component is a sleeve part or structure or element or device or component to incorporate with a logging tool and/or combine with other components. For example, two or more elongated structures having one or more resiliently deformable sections that are combined with one or more other components to form the isolator device. According to some embodiments, the "sleeve" (or structure or element or device or component) is a spring having one or more resiliently deformable sections or other structure or element or device or component having one or more resiliently deformable sections or spring-like sections (e.g., shape memory alloys or composites). According to some embodiments, the isolator device or sleeve comprises at least one resiliently deformable section (e.g., a tubular isolator with a central portion of length configured as a resiliently deformable section). According to preferred alternative embodiments, the isolator device or sleeve comprises at least two or three or four or eight or more resiliently deformable sections. According to preferred alternative embodiments, the sleeve or device comprises multiple resiliently deformable sections. The "tab stop" can be various shapes (e.g., cube, rectangular, cylindrical or other 3D shape) corresponding to the shape and size of the corresponding cavity (while providing room for gap(s) around tab stop to allow for limited deformation of the sleeve). According to preferred embodiments, the tab stop(s) have a largest dimension (or is a square having sides) between 0.25-0.75 in, preferably 0.35-0.65 in, even more preferably between 0.4-0.5 inch (preferred 0.45 inch). Most preferably, the tab stop is a 0.45" square or cubic structure extending from the tab stop structure.

According to some embodiments, the tab stop structure comprises a rigid section connected or adjacent to the cylindrical sleeve allowing the structural load path to bypass the deformable section by closing one or more gaps around the tab if the deformation exceeds a predetermined amount. According to some embodiments, the tab stop structure has a length and a first end and a second end and the at least one tab stop is located as the first end. Preferably, the second end is connected to or adjacent to the cylindrical sleeve. Preferably, the tab stop structure comprises a second tab stop positioned in a second cavity within the annulus region of the cylindrical sleeve, the second cavity configured to provide a gap around one or more sides of the second tab stop, wherein the second tab stop moves within the second cavity as the cylindrical sleeve is deformed but restricts the cylindrical sleeve from being deformed by more than a predetermined amount. According to some embodiments, the at least one tab stop has a cubic shape and the cavity is corresponding cubic. According to some embodiments, the at least one tab stop restricts the cylindrical sleeve from being deformed by more than a predetermined amount when contacting a side of the cavity. Alternatively, a single tab stop having four sides with annular gaps, as shown in FIG. 4 for example, could be modified by or replaced using a pair of tab stops where a first tab stop has annular gaps on the top and right side (but other sides not facing opposing cavity wall or otherwise open), while second tab stop has annular gaps on bottom and left sides. Thus, the first tab stop is configured to resist further deformation in a first range of directions, while the second tab stop is configured to resist deformation in second range of directions.

Moreover, as an alternative to cavity walls, the opposing structure for the tab stop could include bars or posts or other components or structures configured to create one or more tab stop contact rest point(s) with the opposing tab stops. According to some embodiments, the "cavity" is an opening or window or pass-through having at least one wall (e.g., circular) or two or more walls or shoulders (e.g., a rectangular or square opening having four walls) to act against the tab stop if the sleeve is deformed more than an acceptable amount. According to some embodiments, the cavity is not pass-through but instead includes a top surface or ceiling and, preferably is configured to provide a gap between the top of the tab stop and the top surface to provide a stop mechanism when the gap is closed by deformation. According to some embodiments, the cavities are located adjacent the sleeve or in other components of the isolator device (e.g., connecting piece(s), structural components, centralized core or other structural mass). For example, FIG. 1 shows cavities formed within the sleeve structure. However, one or more cavities and/or shoulders for opposing tab stops can be formed using one or more other components (e.g., connection devices, bulk components, etc.) of the isolation device.

According to some embodiments, the cavity is formed by an opening through the annulus region from the inner surface to the outer surface of the cylindrical sleeve. According to some embodiments, the tab stop structure includes a well portion adjacent the tab stop allowing a portion of the cylindrical sleeve to be positioned therein and wherein the well is configured to be larger than the portion of the cylindrical sleeve allowing the cylindrical sleeve to be deformed but restricting the deformation if more than a predetermined amount or more than an estimated amount or otherwise be configured to resist general ranges of deformations and/or otherwise provide additional stiffness to the isolator. According to some embodiments, the acoustic isolation device further comprises a second tab stop structure positioned along the length of the deformable section of the cylindrical sleeve on the opposite side as the first tab stop structure (180 degrees about the axis of the device) and having at least one tab stop positioned in a cavity (preferably within the annulus region of the cylindrical sleeve), the cavity configured to provide a gap around one or more sides of the at least one tab stop, wherein the at least one tab stop moves within the cavity as the cylindrical sleeve is deformed but restricts the cylindrical sleeve from being deformed by more than a predetermined amount or otherwise increases the stiffness properties.

In some embodiments, the device further comprises a third tab stop structure positioned along the length of the deformable section of the cylindrical sleeve at 90 degrees about the axis of the cylindrical sleeve form the first structural mass and having at least one tab stop positioned in a cavity (preferably within the annulus region of the cylindrical sleeve), the cavity configured to provide a gap around one or more sides of the at least one tab stop, wherein the at least one tab stop moves within the cavity as the cylindrical sleeve is deformed but restricts the cylindrical sleeve from being deformed by more than a predetermined amount or otherwise increase the stiffness properties. According to some embodiments, the isolating device may include 3, 4, 5, 6, 7, 8, 9 or 10 tab stop structures or a multiplicity of tab stops, for example, a structure have many individual tab stop structures extending and configured to corresponding cavities or dimples wherein the multiplicity of tab stops move within the cavities as the cylindrical sleeve is deformed but restricts the cylindrical sleeve from being deformed by more than a predetermined amount.

According to some embodiments, the isolator devices further comprise a connecting piece configured to insert into the interior of the cylindrical sleeve. Preferably, the connecting piece includes an adaptor configured to attach the acoustic isolation device to another component of the logging tool. Preferably, the connecting piece has a length and a first end and a second end. Preferably, the diameter at the second end of the connecting piece is larger than the other end. Preferably, the connecting piece has a T-shape (e.g., as shown in FIG. 1). Preferably, the second end of the connecting piece allows for gaps between the first tab stop and the first structural mass allowing the cylindrical sleeve to be compressed and/or flexed but restricts the cylindrical sleeve from being compressed and/or flexed by more than a predetermined amount. According to some embodiments, the device further comprises a second connecting piece configured to insert into the interior at the other end of the sleeve (e.g., as shown in FIG. 1). According to some embodiments, the devices described above further comprise one or more bulkheads and/or additional structural masses. According to some embodiments, the acoustic isolation device (and/or isolator receiver described below) has a length ranging from 3 to 20 inches, preferably 4-10 inches, more preferably 5-8 inches, most preferred around 6.5 inches. According to some embodiments, the acoustic isolation device (and/or isolator receiver described below) has an outer diameter ranging from 1 to 4 inches, preferably 2-3 inches, more preferably 2-2.5 inches and most preferred approximately 2.25 inches. According to some embodiments, the acoustic isolation device and/or isolator receiver) is made of one or more metals or metal alloys, preferably steel. Preferably, 17-4 PH SS steel. According to alternative embodiments, the device is made of one or more composite materials configured for sufficient strength and other required characteristics.

FIG. 1 shows a cross-sectional schematic view of the basic or main isolating elements used to form one or more deformation resistance contacts or mechanical stops between two or more components to resist additional deformation of the isolator. FIG. 1 shows an isolator 100 including sleeve 101 (e.g., first component) and tab structure 102 with tab stop 103 (e.g., second component) extending therefrom through sleeve cavity 104. As seen in FIG. 1, tab stop 103 is configured relative to sleeve cavity 104 to form an annular gap 109 around tab stop 103 allowing the tab stop to move and flex a certain amount (as the isolator is deformed) but then resist further deformation when one or more side surfaces of tab stop 103 contacts one or more cavity side walls 105 and/or cavity bottom wall 106. FIG. 1 also shows at least one connecting piece 120 configured to be inserted within a sleeve 101 and adapted to connect the isolator to other isolators and/or receivers or other components of the logging tool. Preferably, connecting piece 120 is configured and preferably optimized to add mass to the isolator. Preferably, connecting piece 120 has a center opening 130 (e.g., for wires). As shown in FIG. 1, the system preferably includes a second connecting piece 140 (blue) configured to be insert within sleeve 101 at an end opposite the first connecting piece and adapted to connect the isolator to other isolators and/or receivers or other components of the logging tool. As also shown in FIG. 1, in addition to annular gaps 109 around tab stop 103, the isolator is further configured to include additional one or more gaps between the inner surface of the tab stop structure and one or more opposing surfaces of connecting pieces 120/140 and/or one or more vertical surfaces of tab stop structure and one or more opposing vertical surfaces of the connecting pieces 120,140.

FIG. 2 is a side cross-sectional schematic view the isolator of FIG. 1 (rotated 45 degrees along the central axis as shown in FIGS. 3A and 3B with lines A-A and B-B). FIG. 2 shows outer sleeve spring structures 107 configured to allow the sleeve to deform in one or more directions. FIG. 2 also shows screw 150 and screw cups 151 which can be used to assemble the isolator and/or add or incorporate the acoustic isolation components to a receiver or other tool component. Screws and screw cups are used to make up and join elements together.

FIG. 3A is an end cross-sectional view while FIG. 3B a rear side cross-section view of the isolator of FIG. 1. As shown in FIGS. 3A and 3B, the sleeve has a circular cross-section and an inner surface defining an interior and outer surface. FIGS. 3A and 3B also show four tab stop structures 303 around the center axis each separated by 45 degrees. However, alternative configurations can be used included a tab stop structure 303 at every 10 degrees or the like. Each tab stop structure 303 may include two separate tab stops 103 extending therefrom or only have a tab stop 103 on one end with the other end being rigidly anchored in the sleeve 101. Thus, FIG. 3B indicates four sets of tab stops 101 are employed for this isolator embodiment. However, other configurations are possible and within the scope of the present invention, such as tab stop structures 303 having one, two, three, four or more tab stops 103 extending therefrom. According to some embodiments, the tab stops 103 on each tab stop structure 303 are extending from the structure 303 in the same direction, preferably, perpendicular to the central axis of the sleeve 101 (as shown in FIG. 1). As also shown in the rear view shown in FIG. 3A, all or nearly all the space within the isolator 100 except the gaps used for deformation mechanical stop or resist stop contacts (and also excluding the center core for tool wires or components) are occupied by the thickness (or annular region) of sleeve 101, tab stop structure(s) 303, and connecting pieces thus maximizing the mass of the isolator for isolating properties and/or strength characteristics and/or other properties. According to preferred embodiments, sleeve outer surface and/or sleeve inner surface are planar (excluding surface cavities and other features), as shown in FIGS. 1-3. According to some embodiments, sleeve outer surface and sleeve inner surface are parallel to one another as shown in FIGS. 1-8, for example.

The isolator device 100 may include one or more resiliently deformable sections configured for use in an acoustic isolation device for an acoustic well logging tool. According to some embodiments, the isolator 100 includes a sleeve 101 or structure or element or component comprising at least one resiliently deformable section or at least one spring section or at least one spring means or spring means section. According to some embodiments, one sleeve incorporating the spring-like sections (i.e., resiliently deformable sections) has approximately the following properties: Shear stiffness: ~1,100,000 N/m; Axial Stiffness: ~35,500,000 N/m. According to some embodiments for isolator receivers (described below), one sleeve incorporating the spring-like sections has approximately the following properties. Shear stiffness: ~3,900,000 N/m; Axial Stiffness: ~29,000,000 N/m. These properties are calculated using a Finite Element Analysis (FEA) method. These numbers reflect the preferred stiffness of one resiliently deformed isolator system (element or assembly or elements) located between any two of the adapters or masses of the acoustic well logging tool. However, the stiffness can range within a factor of 10 up or down (preferably within a factor of 5 up or down), and result in a tolerable horizontal isolator tool. A horizontal isolator tool typically requires a higher shear stiffness to allow general centralization of the critical elements of the tool (transmitter and receivers). This is necessary to ensure signal quality. A tool only deployed in vertical wells does not have that requirement as gravity will ensure that the tool is straight. Some transverse stiffness however is preferred to aid with make-up and handling. That is, embodiments include ranges from 80,000 N/m to 3,000,000,000 N/m for axial or transverse stiffness which could provide practical acoustic tool vertical or horizontal of any practical diameter with proper designing and use, preferably from ranges from 500,000 N/m to 1,000,000,000 N/m, more preferably ranges from 1,000,000 N/m to 500,000,000 N/m, and even more preferably ranges from 1,000,000 N/m to 100,000,000 N/m.

FIGS. 4A and 4B provides a schematic representation illustrating tab stop 420 within a tab stop cavity configured to resist deformation by more than a predetermined about according to one preferred embodiment. FIG. 4A shows a top view of tab stop 420 within tab stop cavity walls 430. Tab stop 420 includes tab stop upper side 421, tab stop side 422, tab stop lower side 423, and tab stop top 424. FIG. 4B shows a side view of tab stop 420 extending from tab stop structure surface 441 of tab stop structure 440 through sleeve 450 via the cavity (defined by tab stop cavity walls 430). Sleeve 450 comprises sleeve outer surface 451 and sleeve inner surface 452. Both FIGS. 4A and 4B show a tab stop annular gap 460 around tab stop 420. The movement of tab stop 420 in any direction will eventually result in contacting tab stop cavity wall(s) 430 creating one or more mechanical stops or deformation resists. FIG. 4B also shows a stop gap 470 between tab stop structure surface 441 and corresponding sleeve inner surface 452. Deformation of sleeve 450 and/or tab stop structure 440 more than a determined or desired amount will result in contact and resistance of further deformation. That is, the tab stop 420 can result in a mechanical stop or deformation resistance in one or more deformation directions while other gaps between contact surfaces (e.g., between the inner surface of the outer sleeve and one or more surfaces of the tab support structure and/or connecting components) can result in additional mechanical stops or deformation resists.

For example, FIGS. 5A and 5B shows tab stop upper side 421 contacting cavity wall 430 at a tab stop contact rest point 510 at the top side of the cavity showing a remaining annular gap 460 on three of the four sides of the tab stop 420. At that point, the tab stop 420 is pressed against the cavity wall 430 and resisting additional deformation. The isolator can be configured to resist further or additional deformation more than a specific predetermined amount or more than an estimated amount or otherwise be configured to resist general ranges of deformations and/or otherwise provide additional stiffness to the isolator. FIG. 5A and FIG. 5B illustrate a deformation where only a single tab stop contact rest point 510 is shown, while the gap 470 between the sleeve inner surface 450 and tab stop surface 441 still present.

FIGS. 6A and 6B shows tab stop upper side 421 contacting cavity wall 430 at a tab stop contact rest point 510 at the left side of the cavity showing a remaining annular gap 460 on three of the four sides of the tab stop 420. The tab stop 420 can be cubic or circular or cylinder shaped, or have a polygonal cross-section or multi-side cross-section (e.g., pentagon cross-section) or other shapes with at least one side to contact the cavity wall or shoulder to form a tab stop contact rest point to resist further deformation.

FIGS. 7A and 7B show the sleeve inner surface 452 contacting the top surface of the tab stop structure 440 at a mechanical stop rest point 510 between the sleeve 450 and tab stop structure 440, showing a remaining annular gap 460 on all four sides of the tab stop 420.

FIGS. 8A and 8B illustrate an isolator where two or more types and/or directions of deformation are occurring activating two or more mechanical stops or deformation resists. FIG. 8A shows tab stop contact rest points 510 on the upper and left side of tab stop 420 and also between the sleeve inner surface 452 and the surface of the tab stop structure 441 and thus resisting two or more different deformation forces impacting the system, while annular gaps 460 remain on two sides of the tab stop 420. FIGS. 8A and 8B demonstrate the advantages of configuring deformation resist structures or mechanical stops and/or means providing two or more annular gaps 460.

FIGS. 9A and 9B illustrate an isolator where the tab stop cavity does not protrude through the sleeve 450. In addition to all previously mentioned deformations and corresponding tab stop rest points 510, one or more additional possible tab stop rest points 510 according to some embodiments exists on the tab stop top 424.

Figure 11:
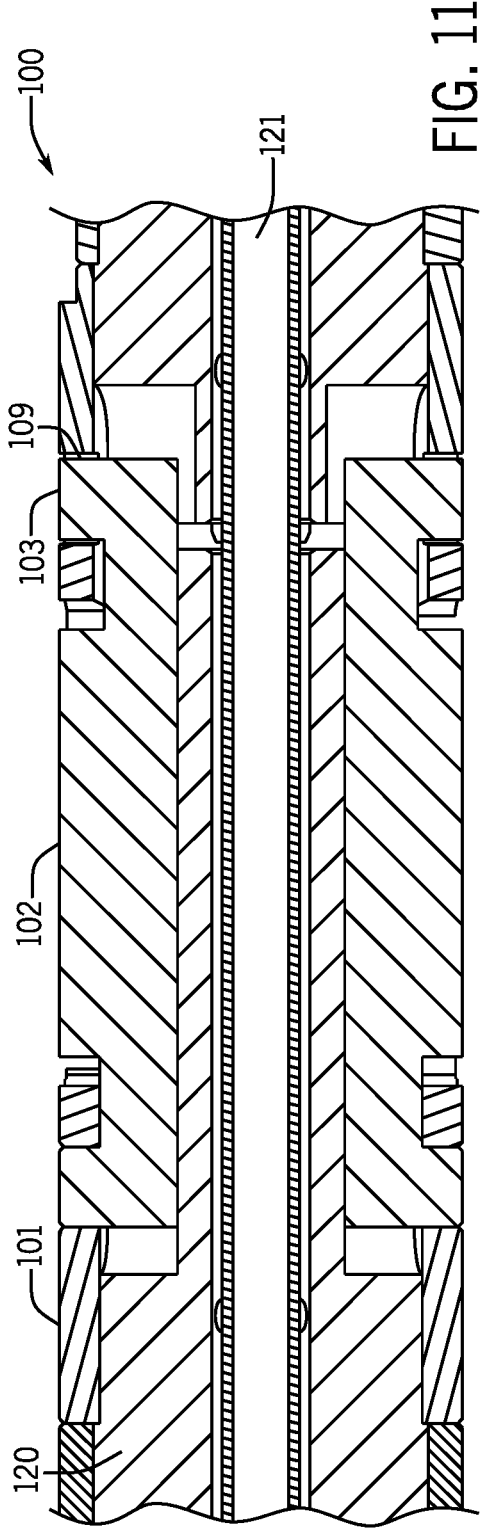
FIG. 11 is a cross-sectional side schematic drawing of the isolator of FIG. 10 according to one embodiment.
Figure 12:
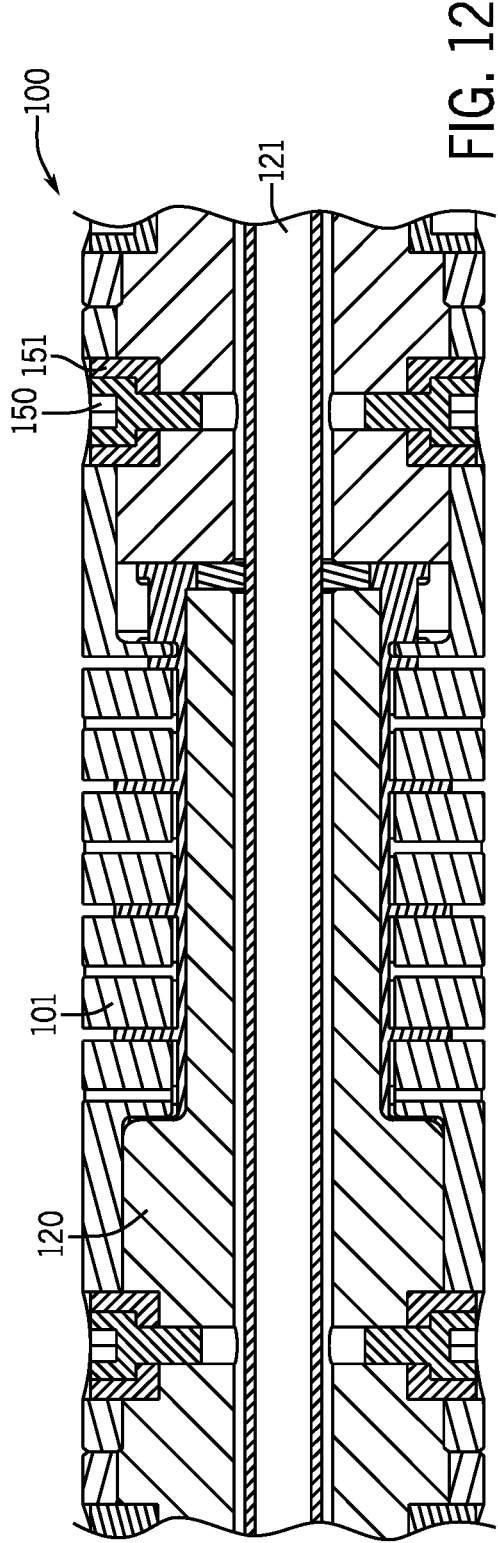
FIG. 12 is a side cross-sectional schematic view the isolator of FIG. 11 (rotated 45 degrees along the central axis).

FIG. 10 is a side view of the isolator device 100 of FIGS. 1, 2, and 3. Isolator device 100 includes outer sleeve 101 and top surface of tab stop 103 having annular gap 109. FIG. 10 also shows resiliently deformable section 107 of outer sleeve 101 composed of multiple vertical slots 1011 along a section of the sleeve 101. The multiple vertical slots 1011 allow the sleeve to flex or otherwise deform. On both ends of the isolator device 100, screws 150 and screw cups 151 connect the isolator device to other isolator devices to form a string of isolator devices. In some embodiments, each tab stop structure has one end rigidly anchored 160 in the outer sleeve 101. FIG. 11 is a cross-sectional side schematic drawing of the isolator embodiment described in FIG. 10, with a wire hose 121 in the center hollow along the central axis. FIG. 12 is a side cross-sectional schematic view the isolator of FIG. 11 (rotated 45 degrees along the central axis).

Figure 13:
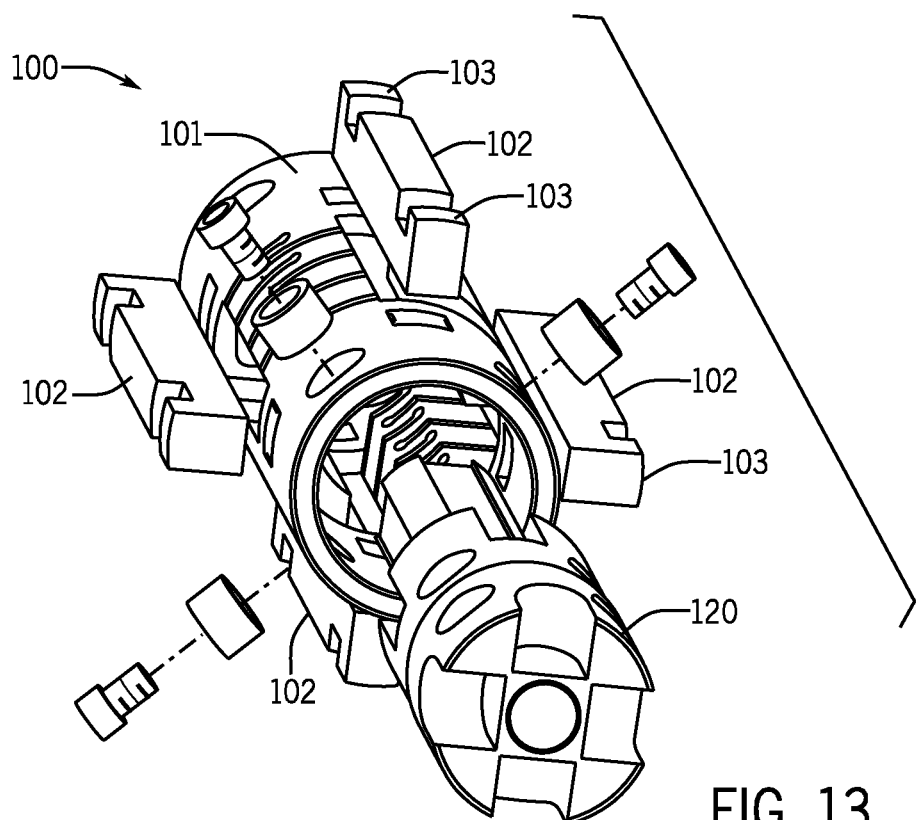
FIG. 13 is a front side perspective exploded schematic view the isolator of FIGS. 1 and 11.
Figure 14:
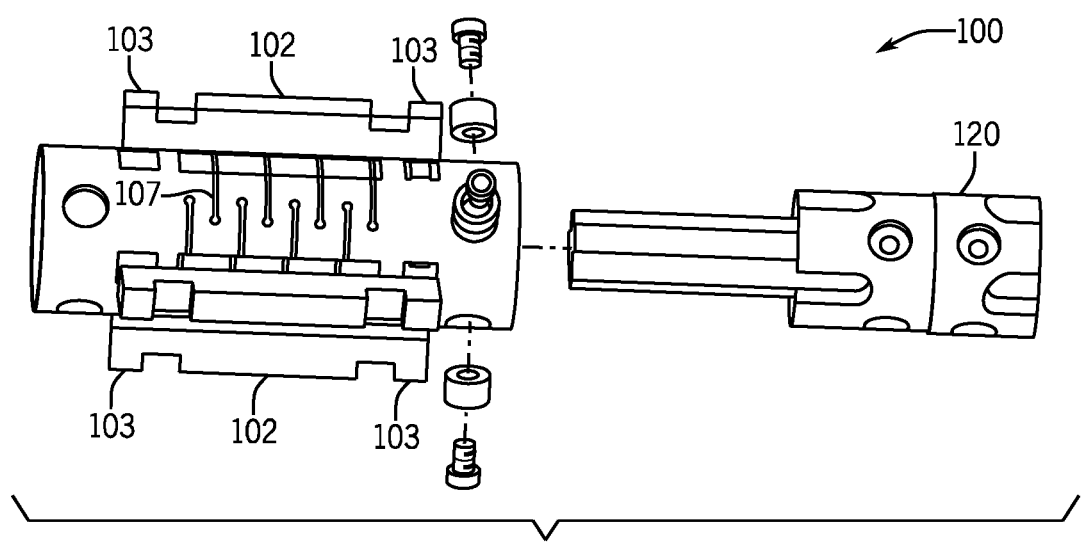
FIG. 14 is a side exploded schematic view the isolator of FIGS. 1 and 11.

FIG. 13 is a front side perspective exploded schematic view of the isolator 100. FIG. 14 is a side exploded schematic view the isolator of FIG. 11. As can be seen in FIGS. 13 and 14, the components of the isolator device 100 are configured to optimize, preferably maximize, the mass of the device. For example, the connecting piece 120 is configured with cavities to accommodate the tab stop structures 102 but otherwise occupy the volume of the sleeve 101 interior. The tab stop structures 102 are therefore also well supported which allows the support of high loads without deflection when the tab stop 103 contacts the tab stop cavity wall and transfers load through the tab stop structure 102. Rigidity is important as it ensures that the tab stop structure 102 prevents or lessens further deflection of the outer sleeve springs.

Another aspect of the invention relates to isolated receivers or assemblies of receivers containing one or more isolator devices 100 according to the invention. According to preferred embodiments, the devices described below further incorporate one or more receiver components (e.g., electronics) within the interior. According to preferred embodiments, the devices described above further comprise one or more hydrophones within the interior.

Figure 15:
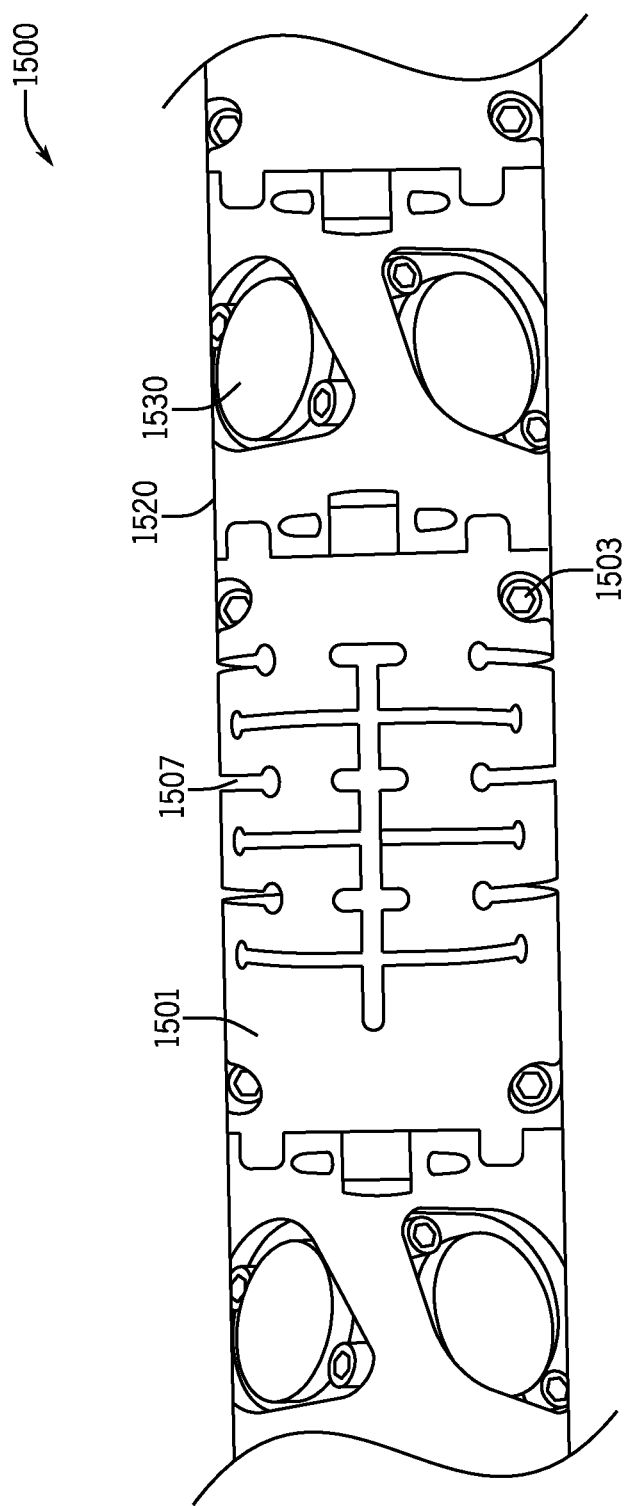
FIG. 15 is a side view photograph of an isolator device according to another embodiment of the invention including receiver components.

FIG. 15 is a side view of an isolator device 1500 according to another embodiment of the invention including receiver components 1530. For example, one or more isolator components shown in FIG. 1 can be integrated or added to receiver components to provide additional acoustic isolation. FIG. 15 shows outer sleeve 1501 and connecting piece 1520, along with one or more hydrophones 1530 (four shown in FIG. 15). This embodiment is further described in FIGS. 16 and 17 and includes an outer sleeve 1501 with resiliently deformable elements 1507, a tab stop structure, and tab stop within a cavity as in the first embodiment. The tab stop structure and tab stop are not visible as each is hidden by the outer sleeve. As in FIG. 10, vertical slots 1507 are used to modify the axial and shear stiffness of the outer sleeve 1501. While the embodiment represented in FIG. 10 utilized screws and screw cups to join isolator devices together, the embodiment in FIG. 15 uses grooves on the outer sleeve 1501 fitting in grooves in the connecting pieces 1520 to join isolator devices 1500. To allow assembly, the outer sleeve 1501 may be split in two with the two halves held in place through a number of screws 1503.

FIG. 16A is a side cross-sectional schematic view of the isolator device 1500 with receiver components. FIG. 16B is a front cross-sectional schematic view of the isolator device 1500 of FIG. 16A along the red dashed line. FIG. 16A shows a side cross-sectional view of tab stop annular ring 1602. FIG. 16A shows a cross-section view of the tab stop annular ring 1602 within cavity 1604 with a gap 1609 between along the tab stop annular ring 1602 to move and/or flex within cavity 1604 a limited amount but then create a contact resist stop if the deformation exceeds the amount allowed by the configuration. Cavity 1604 includes interior surfaces that can contact the surface of the tab stop annular ring 1602 (e.g., "shoulders" corresponding to the tab stop rim). As described in FIGS. 4, 5, 6, 7, 8 and 9, multiple surfaces on the tab stop annular ring 1602 and tab stop structure 1608 may serve as a tab stop based on the type of deformation. FIG. 16B shows two round holes 1602 on the left and right of the tab stop annular ring. These holes can carry tubes that both carry wires and serve as torsional tab stops. FIG. 17 is a side cross-sectional schematic view of the isolator of FIG. 16A (rotated 45 degrees) showing annular gaps between the inner surface of sleeve 1501 and outer surface of connecting piece 1520.

FIG. 18 is a side cross-sectional schematic view of the isolator 1800 according to another embodiment depicting further details of the electronics 1802 of the receiver components 1530. The tab stop structure 1808 and connecting piece 1820 in this embodiment serves as a pressure vessel that contains the electronics 1802 necessary for the receivers 1530. Bulkheads 1804 on the end of the tab stop structure 1808 also add to the mass of the tab stop structure. In some embodiments, nearly all the volume of the isolator device (more than 90 volume %, more preferably more than 95 vol %, even more preferably 99 vol %) is occupied by components with mass (excluding stop gaps, electronics and core for wire guide).

Figure 19:
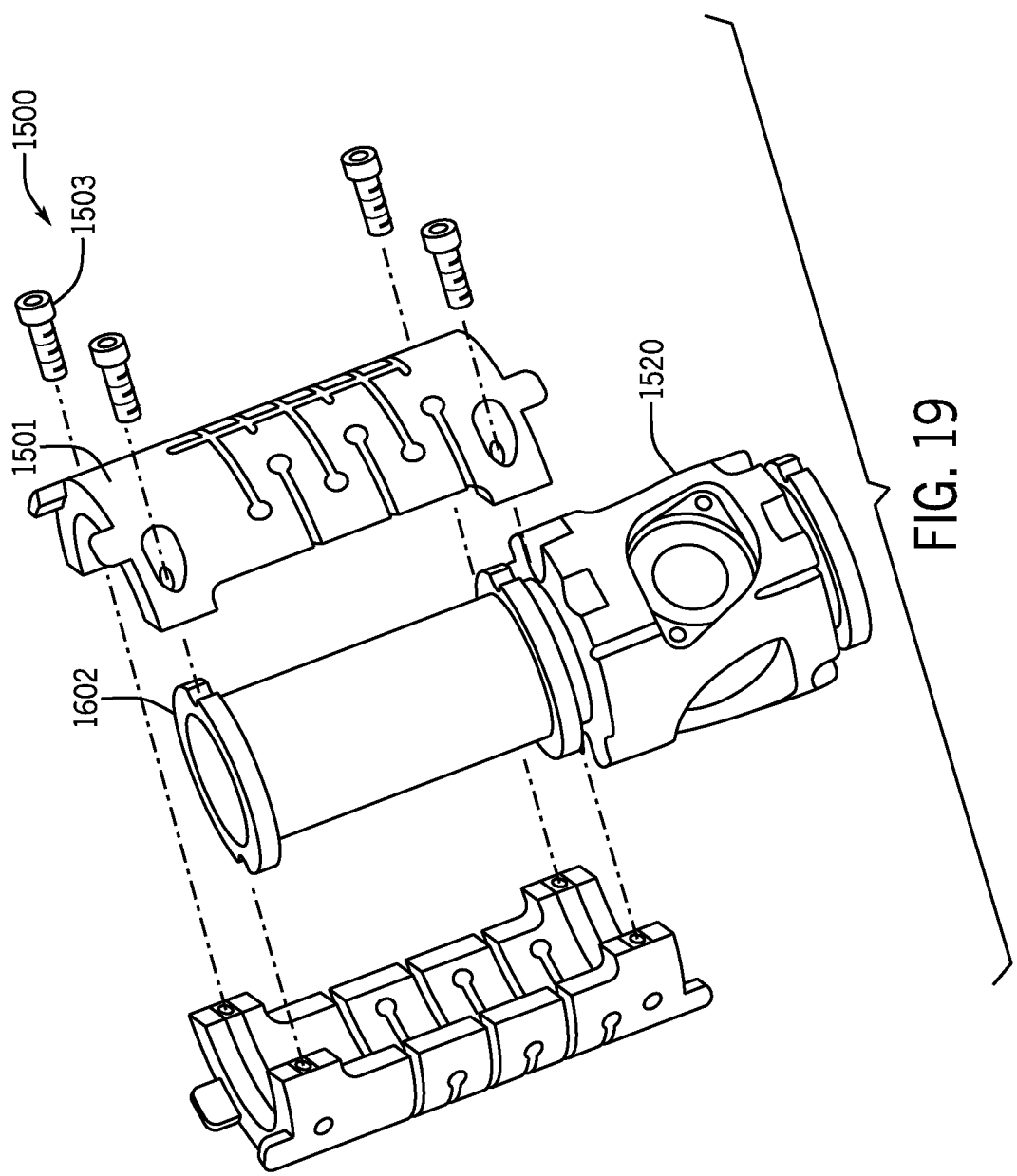
FIG. 19 is a side exploded schematic view of the isolator of FIG. 15.

FIG. 19 is a side exploded schematic view of the isolator 1500 of FIG. 15. As can be seen, connecting piece 1520 includes a tab stop annular ring 1602 at one end corresponding to an interior annular cavity or slot in the interior of the two-part sleeve 1501. That is, the tab stop annular ring 1602 around the outer surface of the end of the connecting piece 1520 is sized and configured to fit within a corresponding cavity or slot on or in the inner surface of the sleeve 1501 allowing for gaps to allow for limited deformation as described herein. Screws 1503 serve to hold the two outer sleeve halves in place.

Figure 20:
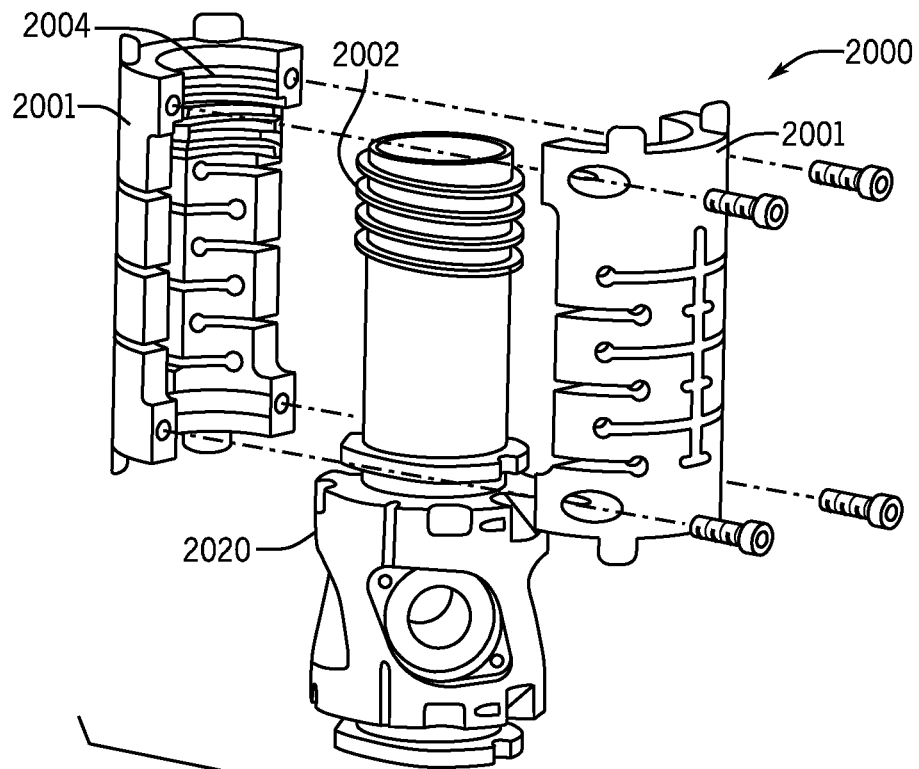
FIG. 20 is a side exploded schematic view of an isolator receiver according to another embodiment showing helical elements as stop mechanism.

FIG. 20 is a side exploded schematic view of an isolator receiver 2000 according to another embodiment showing helical elements 2002 as stop mechanism. The helical elements 2002 on the surface of the connecting piece 2020 are configured to correspond to opposing helical cavities 2004 on the inner surface of the sleeve 2001 to provide a gap between the outer surface of the helical elements and the inner surface of the helical cavities. It is allowed to move a little while being completely inserted into the bore (e.g. wiggle), but the amount of movement is restricted when the surface of the male threads contact the surface of the corresponding female threads within the bore.

Figure 21:
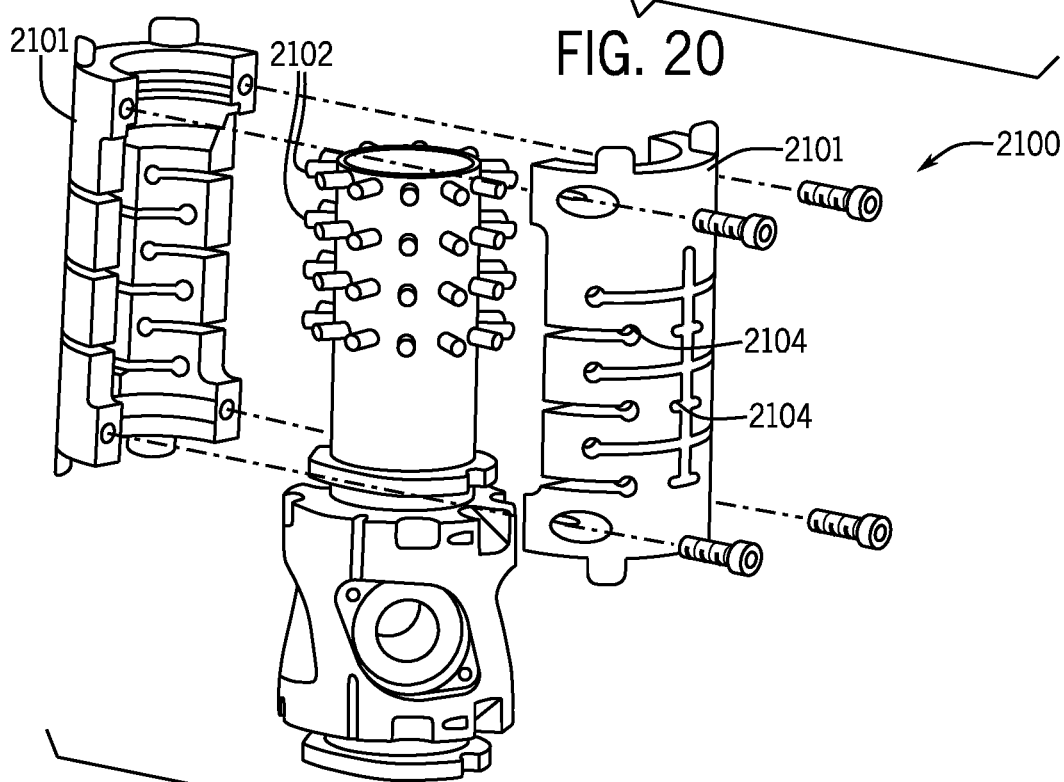
FIG. 21 is a side exploded schematic view of an isolator receiver according to another embodiment showing pegs and corresponding port elements as stop mechanism.

FIG. 21 is a side exploded schematic view of an isolator receiver 2100 according to another embodiment showing many male peg stops 2102 and corresponding female port elements 2104 as a stop mechanism.

Figure 24:
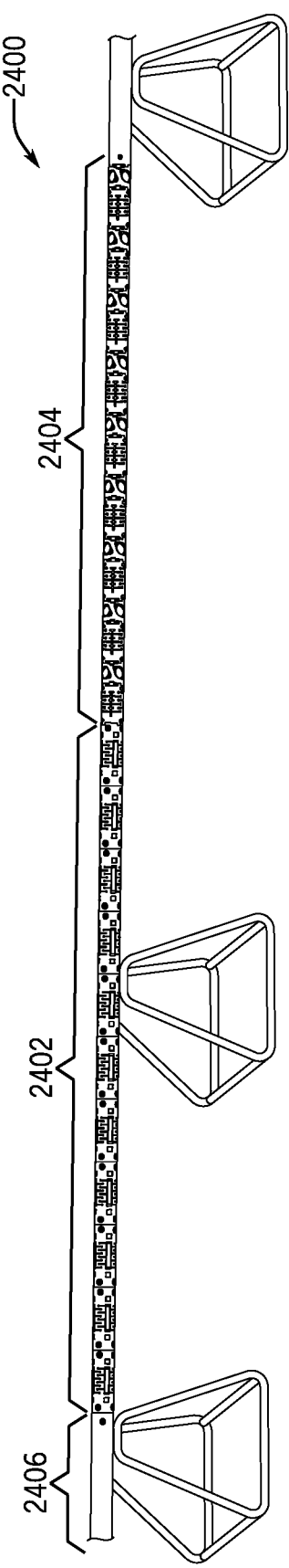
FIG. 24 illustrates a full sonde according to another embodiment of the invention.

FIG. 22 shows a connected string 2200 of a plurality of isolators 2202 according to another embodiment of the invention. FIG. 23 shows a connected string of a plurality of receiver isolators 2302 according to another embodiment of the invention. FIG. 24 shows a full Sonde 2400, which includes a transmitter 2406, isolators 2402 and receivers 2404 connected in a string, according to another embodiment of the invention. The two series of isolator serve to progressively delay and attenuate the body signal propagating from the transmitter to the receivers. FIG. 24 shows the ability of the isolator and receiver to be supported in critical areas and keep the receivers in line. In practice, this would be in the center of a borehole.

Another aspect of the invention relates to methods of using the one acoustic isolation device as described herein, the method includes connecting at least one acoustic isolation device to an acoustic well logging tool. The method further includes obtaining one or more measurements from the acoustic well logging tool. In some embodiments, the method further includes construction that allows for easy disconnection of the isolator elements from the receiver elements, for instance, for maintenance or changing of one or more isolators to one or more isolators that are more or less effective at attenuating and slowing the signal, but have mechanical properties that may be more advantageous for the its subsequent operation and/or application. For instance, the well logging tool may be used in a vertical borehole within a rock formation that has extremely slow acoustic velocities, which require highly effective isolation at the cost of low stiffness. In some embodiments, the method further includes construction with minimal elastomeric elements, and remaining elastomeric elements having minimal cross section to reduce the risk of explosive decompression resultant from gas expansion after exposure to environments with gasses at high partial pressures. In some embodiments, the method further includes modular construction to allow relatively economical replacement of any damaged resiliently deformable sections. For example, one or more subcomponents or parts of the device are adapted to be removed and replaced. In some embodiments, the method further includes modular construction of resiliently deformable sections that are resultant of slots cut in metal sleeves. This allows for easy computation and determination of acoustic performance without the need for excessive iterations and experimentation.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. An acoustic isolation device for a logging tool, the acoustic isolation device comprising:
    a cylindrical sleeve having a length, central axis along the length, a first end and a second end, and one or more cavities formed in the cylindrical sleeve, the cylindrical sleeve further comprising at least one resiliently deformable section between the first end and the second end along a least a portion of the length of the cylindrical sleeve, the deformable section allowing the cylindrical sleeve to be deflected; and
    a tab stop structure positioned within the cylindrical sleeve along the length of or adjacent to the deformable section of the cylindrical sleeve, the tab stop structure having at least one tab stop extending from the tab stop structure and into a cavity of the one or more cavities formed in the cylindrical sleeve, the cavity providing a gap around one or more sides of the at least one tab stop, wherein the at least one tab stop is movable within the cavity as the cylindrical sleeve is deformed but restricts the sleeve from a deformation by more than a predetermined amount.

2. The acoustic isolation device of claim 1, wherein the tab stop structure comprises a rigid section connected to the cylindrical sleeve allowing a structural load path to bypass the deformable section by closing one or more gaps around the tab stop if the deformation exceeds the predetermined amount.

3. The acoustic isolation device of claim 1, wherein the tab stop structure comprises a second tab stop positioned in a second cavity within an annulus region of the cylindrical sleeve, the second cavity configured to provide a gap around one or more sides of the second tab stop, wherein the second tab stop moves within the second cavity as the cylindrical sleeve is deformed but restricts the cylindrical sleeve from being deformed by more than the predetermined amount.

4. The acoustic isolation device of claim 1, further comprising a second tab stop structure positioned along the length of the deformable section of the cylindrical sleeve on an opposite side as the tab stop structure and having at least one second tab stop positioned in a second cavity within an annulus region of the cylindrical sleeve, the second cavity configured to provide a second gap around the one or more sides of the at least one second tab stop of the second tab stop structure, wherein the at least one second tab stop of the second tab stop structure moves within the second cavity as the cylindrical sleeve is deformed but restricts the cylindrical sleeve from being deformed by more than the predetermined amount.

5. The acoustic isolation device of claim 1, further comprising a connecting piece configured to insert into an interior of the cylindrical sleeve.

6. The acoustic isolation device of claim 5, wherein the connecting piece includes an adaptor configured to attach the acoustic isolation device to another component of the logging tool.

7. The acoustic isolation device of claim 1, further comprising one or more receiver components.

8. An acoustic isolation device for an acoustic well logging tool, the acoustic isolation device comprising:
- a sleeve having a length, central axis along the length, a first end and a second end and an interior between the first end and second end and comprising a resiliently deformable section between the first end and the second end along a least a portion of the length of the sleeve configured to allow the sleeve to be deformed, and
- a rigid structure connected to or adjacent the cylindrical sleeve and configured to allow the sleeve to be deformed but restricts the sleeve from being deformed by more than a predetermined amount.

9. The acoustic isolation device of cairn 8, wherein the rigid structure comprises one or more tabs inserted into corresponding cavities formed in the sleeve with space between the one or more tabs and the corresponding cavities to permit a restricted amount of movement of the one or more tabs within the corresponding cavities.

10. The acoustic isolation device of claim 8, wherein the rigid structure comprises a plurality of protrusions and the sleeve comprises one or more corresponding recessions, wherein the plurality of protrusions are positioned within the one or more corresponding recessions to permit a restricted amount of movement of the protrusions within the one or more corresponding recessions.

11. The acoustic isolation device of claim 8, further comprising a connecting piece configured to mate with a second connecting piece of another acoustic isolation device.

12. The acoustic isolation device of claim 11, wherein the rigid structure comprises a protrusion extending at least partially into a recession in the sleeve, wherein the connecting piece is configured to allow for gaps between the protrusion and the recession, allowing the sleeve to be compressed, flexed, sheared, torqued, or tensioned but restricts the sleeve from being compressed or flexed by more than the predetermined amount.

13. The acoustic isolation device of claim 8, further comprising one or more receiver components.

14. The acoustic isolation device of claim 8, wherein the rigid structure comprises a plurality of protrusions and the sleeve comprises one or more corresponding recessions, wherein the plurality of protrusions are positioned within the one or more corresponding recessions to permit a restricted amount of movement of the protrusions within the one or more corresponding recessions.

15. An acoustic logging tool, comprising:
- a transmitter,
- a receiver, and
- an acoustic isolation assembly, the at least one acoustic isolation assembly comprising:
  - a sleeve having a length, central axis along the length, a first end and a second end and an interior between the first end and second end and comprising a resiliently deformable section between the first end and the second end along a least a portion of the length of the sleeve configured to allow the sleeve to be deformed, and
  - a rigid structure connected to or adjacent the cylindrical sleeve and configured to allow the sleeve to be deformed but restricts the sleeve from being deformed by more than a predetermined amount.

16. The acoustic logging tool of claim 15, wherein the receiver is located on the acoustic isolation assembly.

17. The acoustic logging tool of claim 15, further comprising a plurality of acoustic isolation assemblies connected in a string.

18. The acoustic logging tool of claim 15, wherein the acoustic isolation assembly is positioned between the transmitter and the receiver.

19. The acoustic logging tool of claim 15, wherein the rigid structure comprises one or more tabs inserted into corresponding cavities formed in the sleeve with space between the one or more tabs and the corresponding cavities to permit a restricted amount of movement of the one or more tabs within the corresponding cavities.

20. The acoustic logging tool of claim 15, wherein the rigid structure comprises a plurality of protrusions and the sleeve comprises one or more corresponding recessions, wherein the plurality of protrusions are positioned within the one or more corresponding recessions to permit a restricted amount of movement of the protrusions within the one or more corresponding recessions.

\* \* \* \* \*